(12) United States Patent
Habendorf et al.

(10) Patent No.: US 8,224,339 B2
(45) Date of Patent: Jul. 17, 2012

(54) MOBILE NETWORK WITH INVERSE FREQUENCY SUPERPOSITION

(75) Inventors: Rene Habendorf, Dresden (DE); Ernesto Zimmermann, Dresden (DE)

(73) Assignee: Vodafone Holding GmbH, Dusseldorf (DE)

( * ) Notice: Subject to any disclaimer, the term of this patent is extended or adjusted under 35 U.S.C. 154(b) by 755 days.

(21) Appl. No.: 12/313,278

(22) Filed: Nov. 17, 2008

(65) Prior Publication Data
US 2009/0137239 A1    May 28, 2009

Related U.S. Application Data

(63) Continuation of application No. PCT/EP2007/054529, filed on May 10, 2007.

(30) Foreign Application Priority Data

May 18, 2006 (DE) .......................... 10 2006 023 641

(51) Int. Cl.
*H04W 40/00* (2009.01)
(52) U.S. Cl. ......... 455/446; 455/447; 455/448; 455/449
(58) Field of Classification Search ........... 455/446–449
See application file for complete search history.

(56) References Cited

U.S. PATENT DOCUMENTS

| | | | |
|---|---|---|---|
| 6,339,708 B1 * | 1/2002 | Wang | 455/447 |
| 6,351,654 B1 * | 2/2002 | Huang et al. | 455/562.1 |
| 6,788,943 B1 * | 9/2004 | Hamalainen et al. | 455/450 |
| 7,047,009 B2 * | 5/2006 | Laroia et al. | 455/437 |
| 7,227,850 B2 * | 6/2007 | Dahlman et al. | 370/330 |
| 7,373,150 B2 * | 5/2008 | Cho et al. | 455/447 |
| 7,386,314 B2 * | 6/2008 | Kim | 455/445 |
| 7,773,966 B2 | 8/2010 | So et al. | |
| 2002/0164989 A1 * | 11/2002 | Skillermark et al. | 455/446 |
| 2002/0173336 A1 * | 11/2002 | Ranta et al. | 455/550 |
| 2004/0190482 A1 * | 9/2004 | Baum et al. | 370/347 |
| 2006/0234715 A1 * | 10/2006 | Cho et al. | 455/447 |
| 2007/0161376 A1 * | 7/2007 | Hulkkonen et al. | 455/447 |
| 2008/0253319 A1 * | 10/2008 | Ji et al. | 370/328 |

FOREIGN PATENT DOCUMENTS
EP    1 192 828 B1    4/2002
WO    WO 96/13952    5/1996

OTHER PUBLICATIONS

XP-000800963—Wireless Personal Communications 9: 149-163, 1999—A Channel Sharing Scheme for Celluar Mobile Communications.
XP001099998—Wireless Personal Communications 18: 79-92, 2001—Space Partitioning Hybrid Channel Assignment Scheme for Cellular Netowrks.
XP-002331762—1999 Kluwer Academic Publishers. pp. 153-186—Radio Aspects.

* cited by examiner

*Primary Examiner* — Nathan Mitchell
(74) *Attorney, Agent, or Firm* — Lawrence G. Fridman

(57) ABSTRACT

The invention relates to a mobile network, especially according to that of GSM- and/or UMTS-standards for the communication of mobile stations. The network consists of at least two base stations with antennas for sending and/or receiving communication signals, wherein the covered area of the base stations forms a radio cell which is divided into a close-up range and a far range, wherein different transmission sources are provided for the radio traffic.

20 Claims, 3 Drawing Sheets

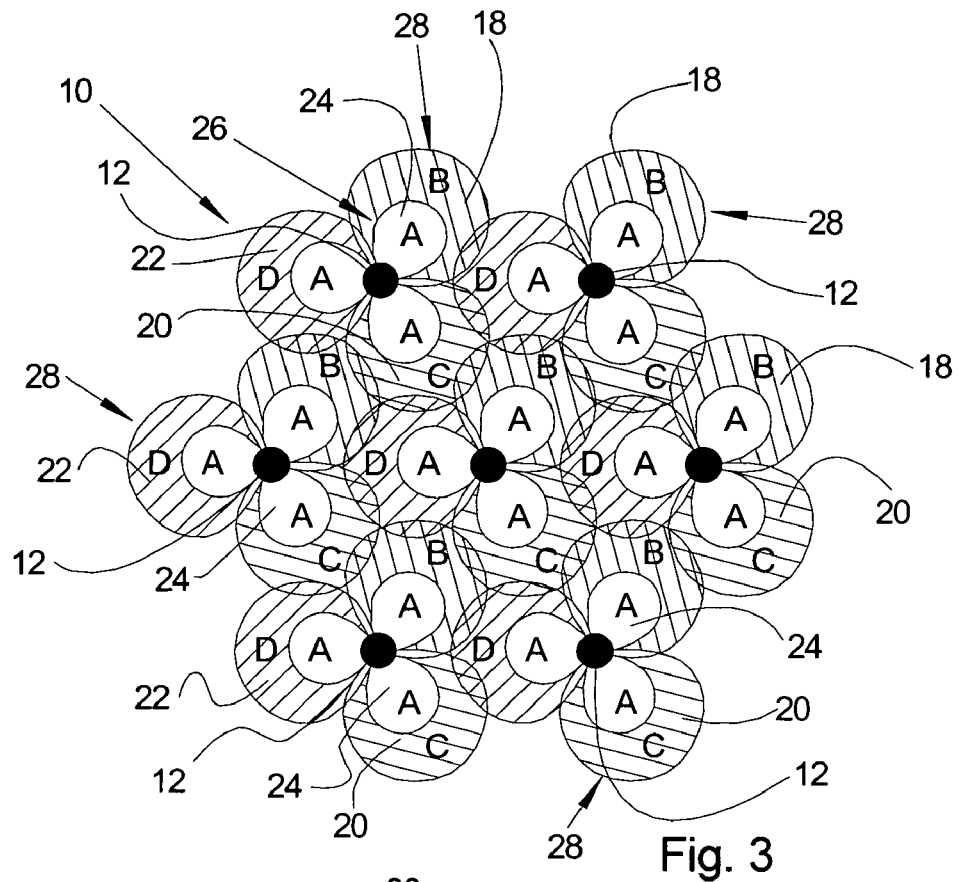
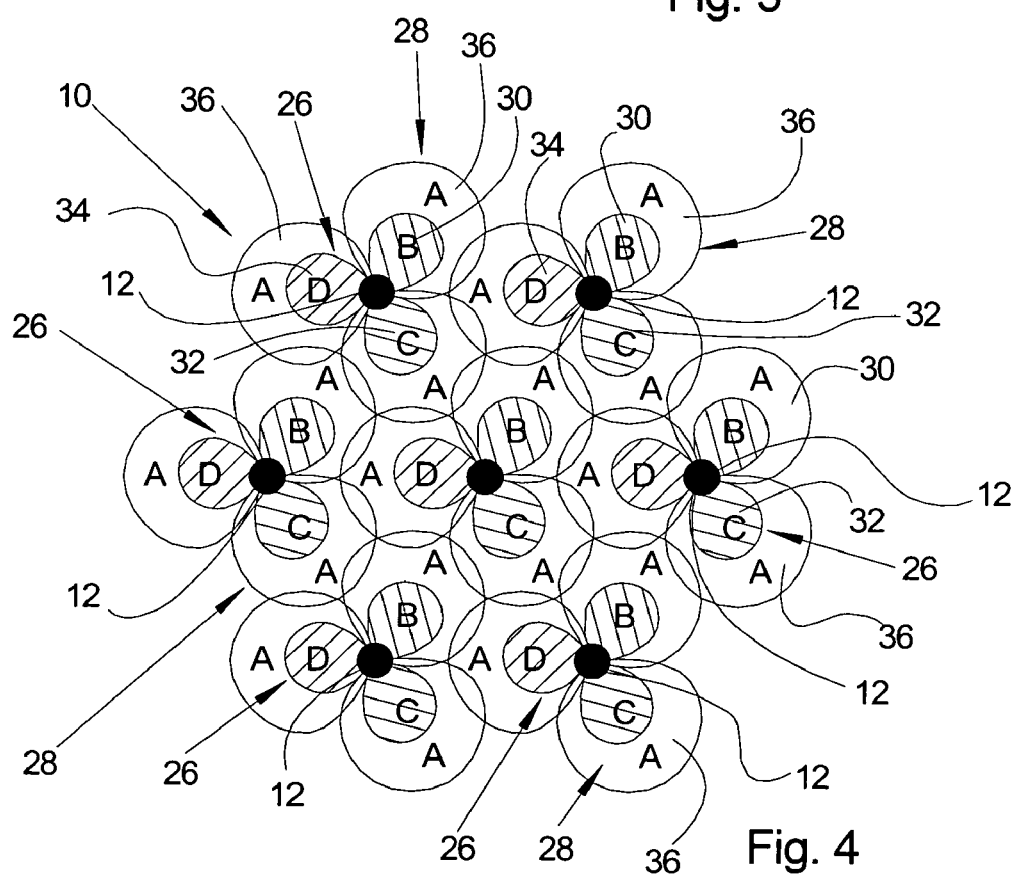
Fig. 3
Fig. 4

MOBILE NETWORK WITH INVERSE FREQUENCY SUPERPOSITION

This is a continuation of international patent application PCT/EP2007/054529, filed May 10, 2007, which claims priority of German patent application S.N. 10 2006 023 641.6 filed May 18, 2006.

FIELD OF THE INVENTION

The invention relates in general to mobile communication networks, and in particular it relates to mobile communication networks operating according to GSM- and/or UMTS-standards for the communication of mobile stations.

BACKGROUND OF THE INVENTION

A mobile network generally comprises base stations which are arranged in an approximately hexagonal pattern. The pattern results from radio cells. The special extension of each radio cell is formed by the covered range of the base stations which are in contact with a mobile station. For this purpose each base station supplies three radio cells by means of three antennas having a relative angle of 120.degree. Each of the three antennas of a base station thereby emits a "sending lobe" of about 120.degree. Such an arrangement of the radio cells of a mobile network system is called "clover model". For the wireless data transmission various resources are available for the operator of a mobile network, such as, for example, frequency bands which are divided into several physical transmission channels. Different transmission resources, for example, frequency bands, in two adjacent radio cells of a mobile network are attributed to the mobile stations. The transmission resources are adjusted in such a way that there is no superposition at all at the borders.

In order to simultaneously support as many connections as possible transmission channels are divided by frequency slots within a frequency bands, time slots within the transmission frame, codes with UMTS. In a GSM-mobile network (=Global System for Mobile communication), for example, a physical channel is formed by a frequency slot and a time slot within the transmission frame of eight subsequent time slots.

The operator of a network must, therefore, re-use the transmission resources as often as possible within the network. Generally, this is achieved when the entire amount of transmission resources is divided into orthogonal subgroups which are then attributed to the respective radio cells. A careful planning of the resources is required for this purpose. Only resources from the subgroup attributed to one particular radio cell are used for the communication in this particular radio cell. Thereby, the distance between radio cells is increase which use the same resources and which are exposed to mobile network signals interfering with each other. A measure for the influence of a transmission by interference is the ratio of a wanted signal intensity and the interference intensity, abbreviated by SIR (Signal to Interference Ratio). Only from a certain SIR-value an acceptable communication can be achieved. This threshold depends on additional thermal noise in the components and the requirements of the individual application, i.e. of quality parameters QoS (Quality of Service).

A further important measure with the planning of the resources, such as, for example, the planning of the frequencies, is the reuse factor. This reuse factor of the individual resource describes, for example, the frequency reuse factor, i.e. the amount of orthogonal subgroups. A reuse factor of one corresponds to the case where each radio cell uses the same resources because there is one group only. A high reuse factor reduces the interference intensity in a mobile network considerably, but limits the spectral efficiency of the network, because in each radio cell only a small amount of the entire resources of the operator of the mobile network is used.

Very often reuse factors "3" and "7" are used in mobile networks. In order to achieve a SIR-value required for a certain service in the entire cell area the system is designed based on the worst case. Therefore, the edge areas of a radio cell where higher interferences occur due to users in adjacent radio cells sending nearby determine the reuse factor of the planned resource. Thereby regions are generated which have an unnecessarily high SIR-value in the central region around the base station thereby reducing the spectral efficiency of the mobile network system.

In order to achieve a special distribution of the SIR in a radio cell which is as homogenous as possible overlay concept systems are described in the literature which have overlapping resource planning. For example the resource can be attributed with a low reuse factor in the inner region of the radio cell and with a high reuse factor in the edge regions. It is a disadvantage of this solution that further reduction of the interfering intensity due to interference suppressing methods is not possible because there are no strong and thereby detectable interferences occur due to the resource planning.

SUMMARY OF THE INVENTION

It is an object of the invention to avoid the disadvantages of the prior art and in particular to increase the efficiency of the mobile network and to increase the capacity thereof.

According to the invention this object is achieved in that with a mobile network, especially operating according to GSM- and/or UMTS-standards for the communication of mobile stations, wherein the transmission resources of the far range of two adjacent radio cells are coincident. The network comprises at least two base stations with antennas for sending and/or receiving communication signals, wherein the covered area of a base station forms a radio cell which is divided into a close-up range and a far range, wherein different transmission sources are provided for the radio traffic.

Furthermore this object is achieved with a method for attributing transmission sources in a mobile network, especially according to GSM- and/or UMTS-standard, for mobile stations for communication, comprising the steps of:
a) forming of at least two radio cells, each resulting from the covered area of a base station with antennas for sending and/or receiving,
b) dividing the radio cells into a close-up range and a far range, and
c) attributing different transmission sources to the close-up range and the far range of the radio cells, so that coincident transmission sources can be attributed to the mobile stations for the communication in the far range of two adjacent radio cells.

Contrary to the prior art the mobile network and method of the invention do not principally try to minimize the interfering intensity caused by interference from adjacent radio cells. Strong interferences are intentionally admitted. The mobile station of a user must adapt to such known interferences and eliminate if necessary. In such a way users of adjacent radio cells can use the same transmission resource, such as a frequency slot, a time slot or a multi user code.

This can be achieved by using a low resource reuse factor at the edge of the cell, i.e. at the border between adjacent radio cells, because then the probability of a user with the same transmission resource in an adjacent radio cell, i.e. in the immediate proximity of the considered user is increased. Such few interferences with high intensity can be removed from the signal of the user using signal processing methods which suppress interferences and thereby a transmission is enabled. By using a low reuse factor the spectral efficiency of the mobile network is increased.

In cell regions where the occurrence of strong and significant interferences is less likely, as it is the case in the center of a radio cell where there is no immediate border of an adjacent radio cell the use of interference suppressing methods makes little sense due to the bad detectability of the weak interferences. In the present invention the interference is reduced by using a high reuse factor.

Thereby, an inverse superposition is achieved. In the prior art a coincident attribution of transmission resources is effected only in the close-up range but not along the cell edges, the far range. Contrary to the above inverse attribution is used with the present invention. Coincident transmission resources are used in the far range and different transmission resources in the close-up range, i.e. just the other way round compared to the prior art.

As to another aspect of the invention, the mobile stations of the mobile network are provided with filter means for removing interfering signals having a higher, the same or slightly smaller intensity than the wanted signal. A slightly smaller intensity corresponds in a preferred embodiment of the invention to a distance of 10 dB between the interference signal and the wanted signal. In an alternative embodiment the distance can be 3 dB or 6 dB. By this measure it is achieved that the interfering signals which are caused in particular by the interference from adjacent radio cells are directly filtered from the wanted signal in the mobile end station of the user and taken off after its detection. It is, therefore, also subject matter of the present invention a mobile station with filter means which are provided for the removing of interfering signals in such a mobile network.

Further advantages result from the subject matter of other claims and the drawings with the accompanying description.

BRIEF DESCRIPTION OF THE DRAWINGS

FIG. 3 shows an embodiment of a mobile network with sending lobes with the reuse factor "1" in the center of the cell and the reuse factor "3" at the edge of the cell;

FIG. 4 shows an embodiment of a mobile network as sending lobes with the reuse factor "3" in the center of the cell and the reuse factor "1" at the edge of the cell.

DETAILED DESCRIPTION OF THE INVENTION

Figure 1:
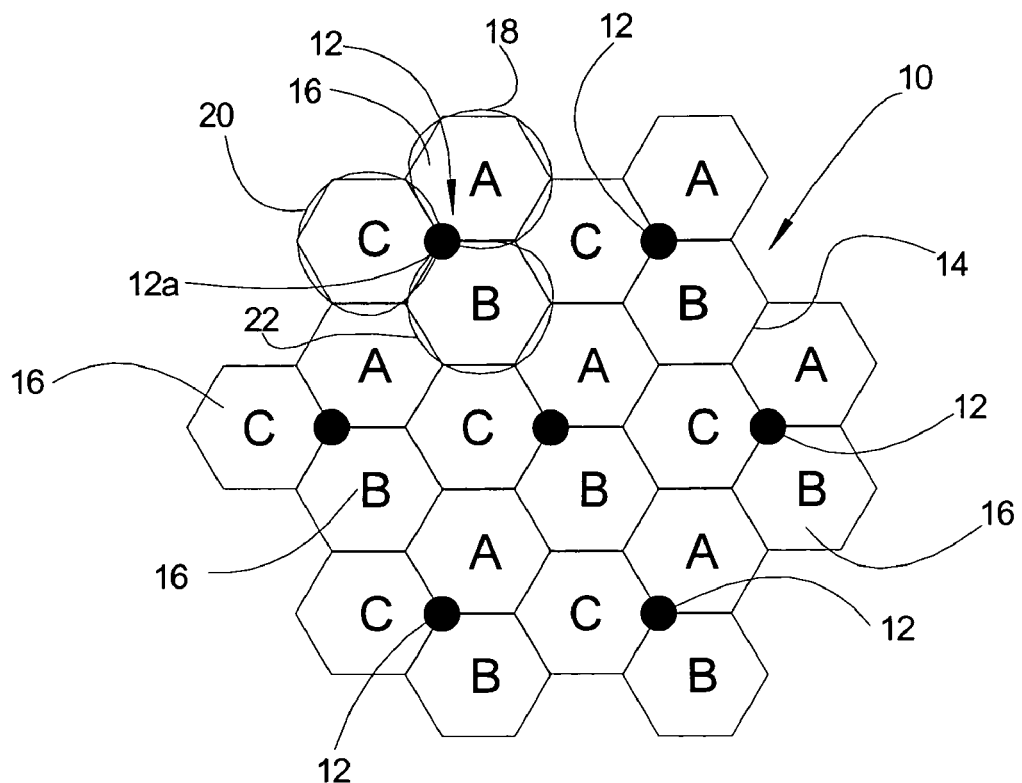
FIG. 1 schematically shows an embodiment of a mobile network with a reuse factor "3" where the use of a certain frequency range is effected in all three radio cells.

In FIG. 1 a schematic drawing of a mobile network 10 is shown. The mobile network 10 generally comprises base stations 12 which are arranged in an approximately hexagonal structure 14. The hexagonal structure 14 results from radio cells 16. The base stations 12 are represented by black dots. Each base station 12 supplies three of the radio cells 16 with three antennas which have a horizontal angle of 120 degree with respect to each other. Each of the three antennas of a base station 12, therefore, emits a sending lobe 18, 20, 22 having about 120.degree. an example of which is shown at the base station 12 a. Such an arrangement of radio cells 16 of a mobile network 10 is called "clover model" and serves in this description for illustration purposes only. The described method may also be used for any other cellular mobile network 10. Frequency bands are used as an example for transmission resource which must be divided between the cells.

Each of the sending lobes 18, 20, 22 of each base station 12 emits in a different frequency band. The different frequency bands are denoted by A, B, C. An important measure for the planning of frequencies is the reuse factor of the respective resource describing the amount of orthogonal subgroups. A reuse factor of "1" corresponds to the case where each radio cell 16 uses the same frequency band A as there is only one group. A high reuse factor reduces the interference intensity in the mobile network 10 but limits the spectral efficiency of the mobile network 10 as only a small portion of the entire resources is used in each radio cell 16. FIG. 1 shows a mobile network 10 with the reuse factor 3.

Figure 2:
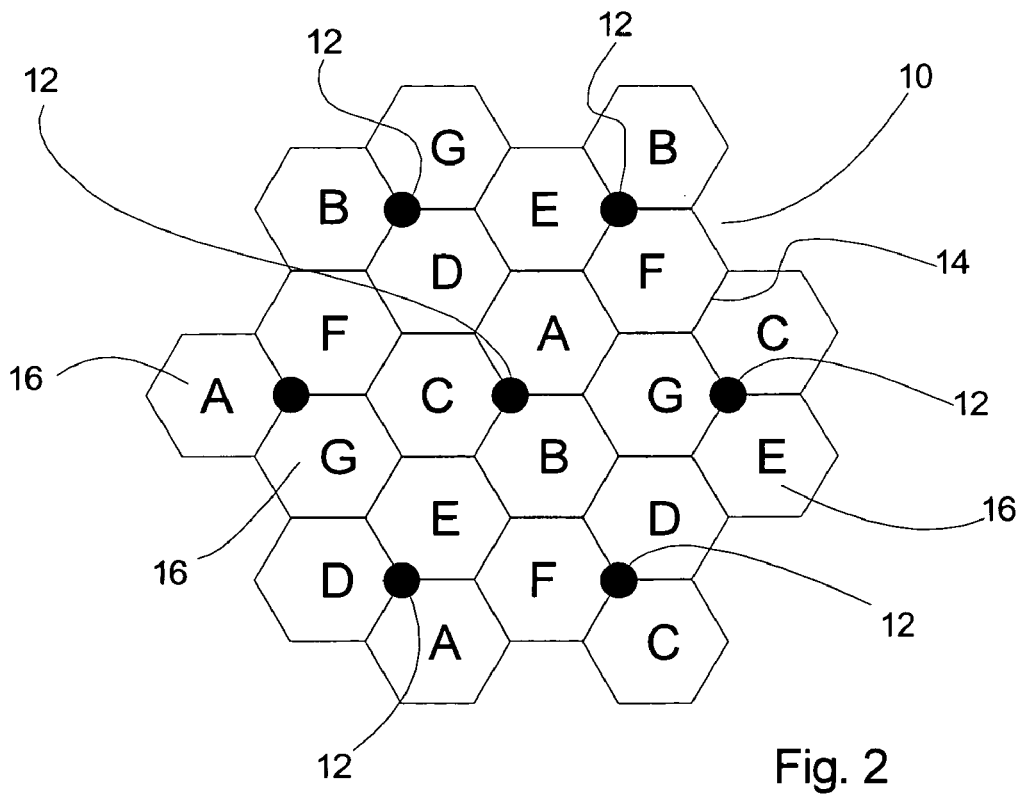
FIG. 2 schematically shows an embodiment of a mobile network with a reuse factor "7" where the use of a certain frequency range is effected in all three radio cells.

FIG. 2 shows a corresponding mobile network 10 with the reuse factor "7". The frequency bands are denoted A, B, C, D, E, F and G.

FIG. 3 shows a mobile network 10 according to the current prior art. Instead of the hexagonal structure 14 shown above only sending lobes 18, 20, 22, 24 are shown. A close-up range 26 and a far range 28 are attributed to each base station 12. The close-up range 26 is in the immediate neighborhood of each base station 12. The far range 28 extends to the edge of the radio cell 16. Reuse factor "1" is provided for the close-up range 26. All sending lobes 24 in the close-up range 26 are provided with the same frequency band A. In the far range 28 of each base station 12 the reuse factor "3" is provided. All sending lobes 18, 20, 22 are provided with different frequency bands B, C, D.

FIG. 4 shows a mobile network 10 according to the present invention with inverse frequency superposition. A close-up range 26 and a far range 28 are attributed to each base station 12 corresponding to FIG. 3. The close-up range 26 is in the immediate neighborhood of each base station 12. The far range 28 extends from there to the edge of the radio cells 16. The close-up range 26 is supplied by sending lobes 30, 32, 34. The far range 28 is covered by sending lobes 36. The sending lobes 30, 32, 34 have different frequency bands B, C, D. The sending lobes 36 of the far range use a coincident frequency band A. The present mobile network 10, therefore, is provided with a reuse factor "3" in the close-up range 26 and with a reuse factor "1" in the far range with respect to the frequency bands A, B, C, D. Thereby the same coincident frequency bands A are always used in the far range 28 of two adjacent radio cells.

Figure 5:
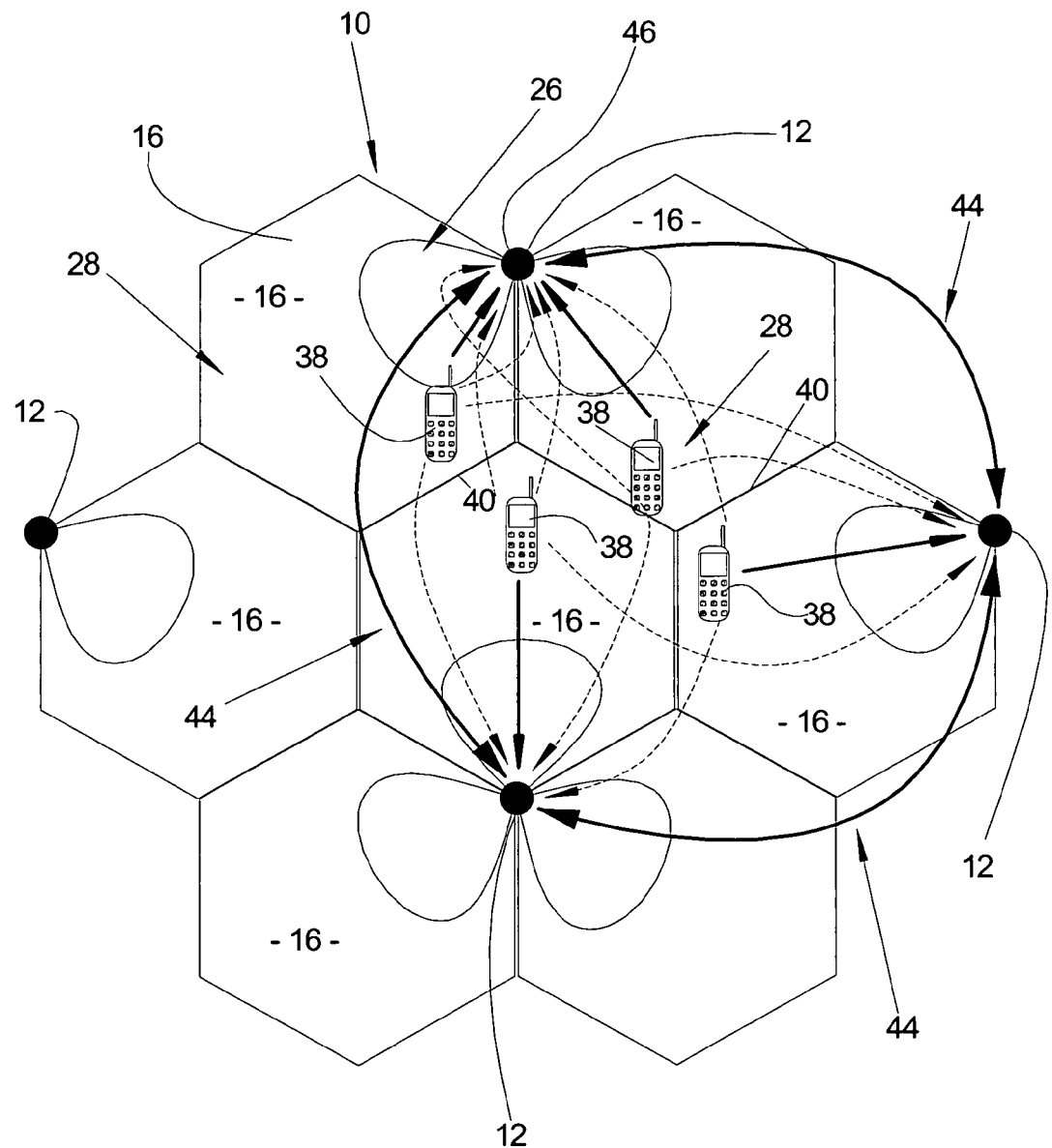
FIG. 5 shows an embodiment of a mobile network with mobile stations for the suppression of interfering signals.

An embodiment for interference suppressing methods is described in greater detail below. In FIG. 5 four mobile stations 38 are shown which communicate from the edge of a cell 40 with the base station 12 of the respective radio cell 16. Such connections are represented by arrows 42. The mobile stations 38 in the mobile network 10 with inverse frequency band superposition use a small frequency band reuse factor. With the reuse factor of 1 used in the present embodiment all mobile stations 38 use the same frequency band A in the far range 28 of the radio cells 16 and, therefore, generate an interfering intensity by interference with each other.

In the uplink from the mobile stations 38 to the base stations 12 each base station 12, therefore, receives a superposition of signals of a user attributed thereto having signals of users from adjacent radio cells 16. Adjacent base stations 12 can now connect to an active group 44 in such a way that they transmit their signals received from, for example, landlines or radio relay systems, to a central knot which, for example, can be formed from one of the base stations 46 of the active group 44, and thereby form a virtual multiple point to point MIMO system. The term MIMO (=Multiple Input Multiple Output) generally denotes systems with several sender—and receiver antennas for the increase of the data rate and the improvement of the transmission quality.

In multiple point to point MIMO systems a common signal processing can be achieved only at the receiver as the transmitters do not cooperate as it is the case in the uplink of a mobile network system. In such a central knot known MIMO detection methods, such as, for example, VBLAST-receivers, decision feedback demodulator, successive or parallel interference suppression or linear demodulation can be used to separate the individual uplink data flows of the active group 44 and to forward them to the mobile network 10 for further transmission or processing. Such a common processing of the received signal is summarized in the literature with the term "joint detection". The strong interference which would exclude the successful detection at individual base stations 12 is inherently removed by the MIMO detection.

The formation of the active group 44 and the attribution of a central knot can be dynamically effected in the running network operation by measuring the interference situation. For this purpose the measurement of the strength of the transmission channel between a mobile station 38 and adjacent base stations 12 can be used by means of pilot sequences which are present in the handover procedures.

Furthermore the knowledge of the transmission channels with a significant intensity portion between the mobile station 38 and the base station 12 of the active group 44 is necessary for a successful MIMO detection. For this purpose a possibility for the undisturbed channel measurement must be provided which can be carried out by orthogonal pilot sequences or the sending of pilot sequences in time multiplex methods.

In the downlink from the base stations 12 to the mobile stations 38 a point to multiple point MIMO system can be formed by the described cooperation between the base stations 12 where in one central knot a pre-processing of the sending signals of each base station 12 is effected in such a way that the signal received and superimposed by the mobile stations 12 has a high SIR-value. Linear pre-modulation or "Tomlinson-Harashima Precoding (THP) can be used as premodulate methods. The knowledge of the transmission channel on the sender side necessary for this method can be obtained in TDD (=Tine Division Duplex) Systems by measuring the transmission channel in the uplink because the transmission channel is reciprocal regarding the uplink and downlink. If this reciprocal channel is not present, such as, for example, in FDD (=frequency division duplex) systems the channel estimates determined in the uplink can be transmitted through a return channel to the sender.

The invention claimed is:

1. A mobile network for communication mobile stations, comprising: at least two base stations having antennas for sending and receiving communication signals, said communication signals forming a radio traffic in said mobile network,
   wherein each of said base stations covering an area thereby forming a radio cell, so as to provide the at least two adjacent radio cells with a border area therebetween, a close-up range and a far range are attributed to each said base station, each said close-up range is attributed to a neighborhood adjacent the respective base station and each said far range extends to said border area,
   wherein frequency bands and transmission resources that are attributed to the close-up range of one of said base stations are different from the frequency bands and transmission resources of the close-up ranges of others of said base stations, and
   wherein identical coincident frequency bands are attributed to said far ranges of said base stations,
   wherein a reuse factor in said far ranges is smaller than the reuse factor in said close-up ranges.

2. A mobile network according to claim 1, wherein said transmission resources comprise arrangement for transmitting said communication signals in a form of modulated frequencies.

3. A mobile network according to claim 1, wherein said transmission resources comprise arrangement for transmitting said communication signals in the form of time slots.

4. A mobile network according to claim 1, wherein wanted signal and interfering signal occur with an intensity in said mobile network and wherein a filter arrangement is provided for removing said interfering signals.

5. A mobile network according to claim 4, wherein said intensity of said interfering signals corresponds to said intensity of said wanted signals.

6. A mobile network according to claim 1, wherein said mobile network operates according to GSM- and/or UMTS-standards.

7. A mobile network as claimed in claim 6, wherein wanted signal and interfering signal occur with intensity in said mobile network, and a filter arrangement is provided in said mobile station for removing said interfering signals.

8. A mobile network according to claim 7, wherein said intensity of said interfering signals corresponds to said intensity of said wanted signals.

9. A mobile network according to claim 1, wherein an inverse frequency superposition is provided in said mobile network and admission of occurring interferences is maximized at the border area between said adjacent radio cells.

10. A mobile network according to claim 1, wherein the reuse factor "3" is provided in the close-up ranges and the reuse factor "1" is provided in the far ranges.

11. A method for attributing transmission resources in a mobile network for communication between mobile stations, said mobile network comprising at least two base stations with antennas for sending and receiving communication signals, said communication signals forming a radio traffic in said mobile network, each said base station having a predetermined coverage area, said method comprising the steps of:
   forming at least two adjacent radio cells with a border area therebetween, each said radio cells resulting from said covered areas of said base stations;
   attributing a close-up range and a far range to each said base station, each said close-up range is attributed to a neighborhood adjacent the respective base station and each said far range extends to said border area;
   attributing frequency bands and transmission resources to the close-up range of one of said base stations that are different than the frequency bands and transmission resources of the close-up ranges of others of said base stations; and
   attributing identical coincident frequency bands and transmission resources for the communication in the far range of said base stations;
   wherein a reuse factor in the far ranges is smaller than the reuse factor in the close-up ranges.

12. A method according to claim 11, wherein an inverse frequency superposition is provided in said network, and admission of occurring interferences is maximized at the border area between said adjacent radio cells.

13. A method according to claim 11, wherein the reuse factor "3" is provided in the close-up ranges and with the reuse factor "1" is provided in the far ranges.

14. A method according claim 11, wherein frequencies are attributed as said transmission resources.

15. A method according to claim 11, wherein time slots are attributed as transmission resources.

16. A method according to claim 11, wherein said mobile network operates according to GSM- and/or UMTS-standard.

17. A method according to claim 16, wherein the transmission resources are provided in the form of frequencies.

18. A method according to claim 16, wherein the transmission resources are provided in the form of time slots.

19. A method according to claim 16, further comprising removing interfering signals via a filtering arrangement.

20. A method according to claim 19, wherein said filter arrangement is adopted for removing the interfering signals having an intensity corresponding to intensity of a wanted signal.

* * * * *